US007038570B2

(12) United States Patent
McMichael et al.

(10) Patent No.: US 7,038,570 B2
(45) Date of Patent: May 2, 2006

(54) PROTECTOR FOR THERMAL SWITCH INSTALLED IN ELECTROMAGNETIC COILS

(75) Inventors: Steven Clyde McMichael, Glenunga (SA); Robert Wilton James, Crafers (SA); Anthony David Colliver, Marino (SA); Andrew Scott Friebe, Bridgewater (SA); Robert Reginald Mara, St Peters (SA)

(73) Assignee: FF Seeley Nominees PTY Ltd., St. Marys (AU)

( * ) Notice: Subject to any disclaimer, the term of this patent is extended or adjusted under 35 U.S.C. 154(b) by 0 days.

(21) Appl. No.: 10/417,899

(22) Filed: Apr. 17, 2003

(65) Prior Publication Data

US 2003/0201868 A1 Oct. 30, 2003

(30) Foreign Application Priority Data

Apr. 19, 2002 (AU) .................................... PS1999

(51) Int. Cl.
*H01H 37/04* (2006.01)
*H01H 37/52* (2006.01)
*H02H 7/08* (2006.01)

(52) U.S. Cl. ........................ 337/380; 337/372; 361/26; 361/105; 310/68 C

(58) Field of Classification Search .................. 337/20, 337/112, 113, 372, 380, 381, 398; 310/68 C, 310/71, 91, 260, 270; 361/23, 25, 26, 37, 361/38, 105, 124; 318/471; 439/620–622
See application file for complete search history.

(56) References Cited

U.S. PATENT DOCUMENTS 2,682,005 A * 6/1954 Hemphill et al. ......... 310/68 C
2,967,269 A * 1/1961 Vaughan ..................... 318/783
3,127,531 A * 3/1964 Tothero ..................... 310/68 C
3,131,322 A * 4/1964 Pleiss et al. ................ 337/380
3,135,883 A * 6/1964 Phillips ..................... 310/68 R
3,215,873 A * 11/1965 Kruger et al. ............ 310/68 R
3,219,856 A * 11/1965 Dunwiddie et al. ....... 310/68 R
3,246,183 A * 4/1966 Slonneger ................. 310/68 R
3,515,917 A * 6/1970 Kolb ........................... 310/71
3,691,425 A * 9/1972 Weyrich et al. ............... 361/41
3,842,297 A * 10/1974 Pleiss et al. .............. 310/68 C
3,959,675 A * 5/1976 Lautner et al. ........... 310/68 C
4,061,935 A * 12/1977 Kandpal ................... 310/68 C
4,112,405 A * 9/1978 Joseph .......................... 337/4
4,132,913 A * 1/1979 Lautner et al. ........... 310/68 C
4,167,721 A 9/1979 Senor et al.
4,186,318 A * 1/1980 Anderson ................. 310/68 C
4,188,553 A * 2/1980 Wheaton .................. 310/68 C
4,224,591 A 9/1980 Senor
4,250,419 A * 2/1981 Zolman ..................... 310/68 C
4,313,069 A * 1/1982 Szabo et al. ............. 310/68 C
4,571,518 A * 2/1986 Kintz et al. ............... 310/68 R
4,734,602 A * 3/1988 Hauser et al. ............ 310/68 C (Continued)

FOREIGN PATENT DOCUMENTS

EP 548610 A1 * 6/1993

(Continued)

*Primary Examiner*—Anatoly Vortman
(74) *Attorney, Agent, or Firm*—Watts Hoffmann Co, L.P.A.

(57) ABSTRACT

A protective device fitted to an electromagnetic coil to prevent damage to a thermal protective switch installed in the electromagnetic coil beneath the winding. In a preferred embodiment there is a subsequent encapsulation process following manufacture of the coil. Preferably, said device comprises a protective cap shaped to conform with the shape of the thermal switch and closely fitting the thermal switch and wiring connected thereto.

8 Claims, 6 Drawing Sheets

U.S. PATENT DOCUMENTS

| | | | | | |
|---|---|---|---|---|---|
| 4,890,025 | A | * | 12/1989 | Hadeler et al. | 310/68 C |
| 5,343,613 | A | * | 9/1994 | Kintz et al. | 29/596 |
| 5,463,522 | A | * | 10/1995 | Van Wagener et al. | 361/103 |
| 5,684,347 | A | * | 11/1997 | Vogt et al. | 310/68 C |
| 5,723,922 | A | * | 3/1998 | Fowlkes | 310/68 C |
| 5,757,262 | A | | 5/1998 | Takeda | |
| 5,867,085 | A | | 2/1999 | Kruck et al. | |
| 6,005,471 | A | | 12/1999 | Higashikata et al. | |
| 6,008,555 | A | * | 12/1999 | Garr et al. | 310/68 C |
| 6,153,954 | A | * | 11/2000 | Uchida et al. | 310/68 C |
| 6,326,879 | B1 | | 12/2001 | Hangmann et al. | |
| 6,329,732 | B1 | * | 12/2001 | Straley | 310/68 B |
| 6,498,560 | B1 | | 12/2002 | White et al. | |
| 2002/0089085 | A1 | * | 7/2002 | Kim | 264/272.18 |
| 2002/0180577 | A1 | * | 12/2002 | Heyden et al. | 338/25 |

FOREIGN PATENT DOCUMENTS

| | | | | |
|---|---|---|---|---|
| JP | 57199453 | A | * | 12/1982 |
| JP | 10271766 | A | * | 10/1998 |

* cited by examiner

PROTECTOR FOR THERMAL SWITCH INSTALLED IN ELECTROMAGNETIC COILS

FIELD OF THE INVENTION

This invention relates to the protection of a thermal switch device installed to protect the windings of an electromagnetic coil during the winding. Preferably, an electromagnetic coil embodiment of the present invention is subsequently encapsulated.

DESCRIPTION OF THE PRIOR ART

Throughout this description and the claims which follow, less the context requires otherwise, the word “comprise”, or variations such as “comprises” or “comprising”, will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

It is an essential requirement, mandated by electrical Standards that the electromagnetic coils used in electric motors and other electrical devices be protected against excessive temperature rises when operating normally, and when a malfunction has occurred to the electrical device or its load. Excessive temperatures in the coils can lead to damage to the coils or other parts, and can result in fire or the danger of electric shock. A common method of protecting the coils against such excessive temperatures is to install a miniature, enclosed, temperature sensitive, snap-action switch in close proximity to the windings. Such a switch is selected to open circuit at temperatures well below temperatures dangerous to the coil windings, and is electrically connected in series with the windings to ensure their electrical isolation in the event of the switch opening.

One method of installing and connecting a thermal switch in an electromagnetic coil is described in U.S. Pat. No. 6,326,879 by Hangmann et al. In U.S. Pat. No. 6,326,879, the electromagnetic coils are wound onto a plastic winding former into which is inserted the iron laminations required to form the magnetic path of the coil. To protect the electromagnetic coil from excessive temperature, a thermal protection switch is placed on the outside of the coils and held in place for example, using an adhesive. The thermal protective switch is electrically connected in series with the coil windings such as to interrupt the flow of current in the event of the thermal switch operating.

The arrangement of the thermal protection switch described by Hangmann is satisfactory for the general construction of these types of coils and motors, whereby the coil and lamination assembly is either operated in free air within a main enclosure, or is enclosed by a close fitting enclosure. However, certain applications require that the coils or motors so produced must operate in an adverse environment. In particular, in an environment whereby the coils and laminations are subjected to water droplets or spray such as within a humidifier or evaporative air cooler, it is particularly desirable to prevent any water from reaching the internal workings of the coil or motor. In such applications it has become normal practice to encapsulate the windings of the coil in a plastic material. One method of achieving such encapsulation is to place the wound coil on its former within the cavity of an injection moulding tool and fill the space between the coil and tool with thermoplastic material injected at high pressure. This method results in a sealed encapsulation of the electromagnetic coils, which are then unaffected by any moisture which may find its way into the motor or coil in normal service.

The encapsulation process subjects the entire space within the injection moulding cavity to high hydrostatic pressures and temperatures. If the construction of the coil and thermal protective switch described in U.S. Pat. No. 6,326,879 were subjected to such a process, the thermal protective switch would undoubtedly be permanently damaged by the crushing hydrostatic pressure and direct contact with the molten thermoplastic during thermoplastic injection.

These extremes of pressure and temperature can be reduced if the thermal protective switch is placed against the plastic former, or in a cavity space formed within the plastic former, prior to the winding of the coil onto the former. In this configuration, the thermal protective switch does not suffer the peak temperatures experienced by the conventional location at the outside of the coil due to the thermal resistance and thermal inertia of the coil now located between the molten thermoplastic and thermal switch. However, the thermal switch is still subjected to high hydrostatic pressures during thermoplastic injection, which have been found to result in permanent damage to a high proportion of switches in production trials. The thermal switch is also subjected to crushing forces from the coils wound over the top of any protrusion of the switch above the plastic former during the coil winding process. The internal construction of typical commercially available thermal switches relies on over-centre bimetallic springs attached to the casing of the switch. When subjected to high hydrostatic pressures, or crushing forces from the coil winding, the casing of the switch is subjected to distortion, which causes significant changes to the switching temperature and operation of the switch. This damage is generally permanent, resulting in scrapping of the manufactured electromagnetic coil. Moreover, since the thermal switch is a mandatory safety device to be incorporated in the coil winding, there must be no question as to its effective and reliable operation in the event of over-heating of the coil.

It is an objective of the current invention to prevent damage to a thermal protective switch fitted to an electromagnetic coil during manufacture, where the switch is installed between a former and windings of the electromagnetic coil.

SUMMARY OF THE INVENTION

The present invention provides, in one aspect, a protective device fitted to an electromagnetic coil to prevent damage to a thermal protective switch installed in the electromagnetic coil beneath the winding. In a preferred embodiment there is a subsequent encapsulation process following manufacture of the coil. Preferably, said device comprises a protective cap shaped to conform with the shape of the thermal switch and closely fitting the thermal switch and wiring connected thereto.

In another aspect the present invention provides a method of making an electromagnetic coil having a thermal protective switch, said method comprising:

positioning said switch on a winding former of said coil, covering said switch with a protective cap adapted to resist forces applied thereto by coil windings wound onto the former and forces and temperatures applied thereto by encapsulation of the coil after windings have been applied to the winding former, such that the thermal protective switch is protected from damage resulting from forces and temperatures applied during manufacture of the electromagnetic coil, applying coil windings to the winding former fitted with the switch and protective cap.

BRIEF DESCRIPTION OF THE DRAWINGS

The present invention will now be described by way of example with reference to the accompanying drawings, in which.

DESCRIPTION OF EMBODIMENTS

Figures 1, 1A:
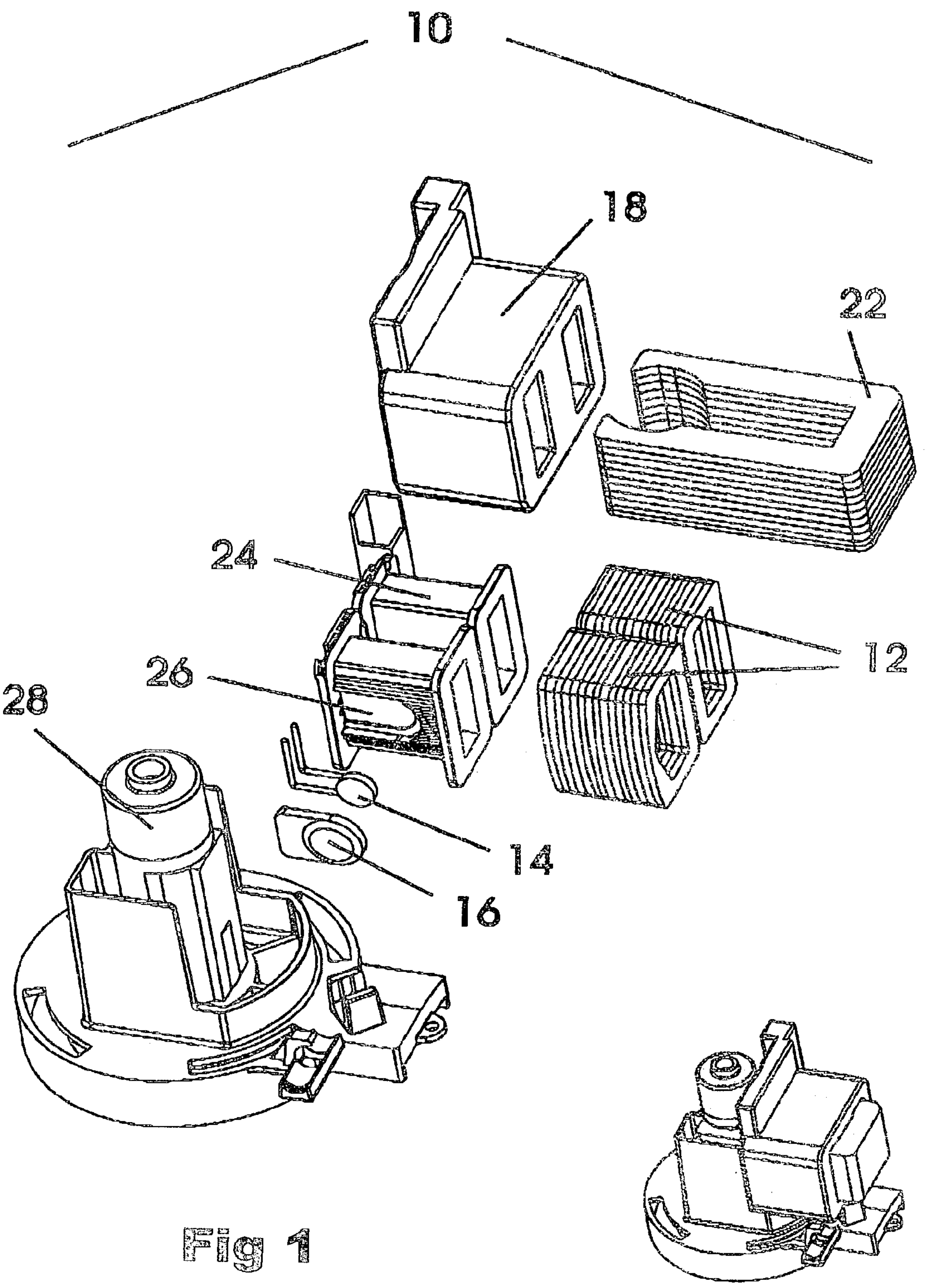
FIG. 1 is an exploded isometric view of a small synchronous permanent magnet motor and its electromagnetic coils where one coil is fitted with a thermal switch in accordance with an embodiment of the present invention.
FIG. 1*a* is an isometric view showing the assembled motor of FIG. 1.

FIG. 1 illustrates an electromagnetic coil as used in the construction of a small alternating current synchronous electric motor 10. While this application is typical of the type of electric motor for which an electromagnetic coil might be used, those skilled in the art will be aware that there are many applications of such coils. These applications include solenoid actuators, relay coils electromagnets etc, all of which require protection against over temperature in the event of a failure of the coil or its controller. The construction of the motor 10 illustrated starts with the former 24, into which the thermal protective switch 14 is placed within a formed cavity 26 within the shape of former 24. The protective cover 16, subject of the current invention, is then placed in position covering the thermal switch 14. The wire coils 12 are then wound onto the former. During the winding process, the thermal switch 14 can be subjected to considerable stress by crushing of the wires 12, which are normally under some tension. The protective cap 16 provides protection against such stress by bearing the crushing load from the wires, and preventing that load from reaching the thermal switch 14.

Following the winding process, the winding on former assembly is inserted into a thermoplastic injection moulding tool into which is injected molten thermoplastic material to fill the cavity space around the winding assembly. This results in the encapsulating material 18 completely sealing off the electrical winding and preventing casual water from reaching electrically live parts. During the thermoplastic injection process, the inside of the tool cavity is subjected to high pressures and temperatures, which would normally damage the thermal protector 14. The inclusion of the protective cap 16, which closely fits over the thermal switch 14 with a very small gap 20 between the protective cap 16 and thermal switch 14 (shown in FIG. 6), prevents any high pressure and high temperature thermoplastic from reaching the thermal switch 14. The fitting of the encapsulated coil and former assembly to the motor laminations 22 completes assembly of the motor. In the pump application illustrated, the motor is then fitted to the plastic moulding 28, which encloses the rotating components of the synchronous electric motor.

Figure 2:
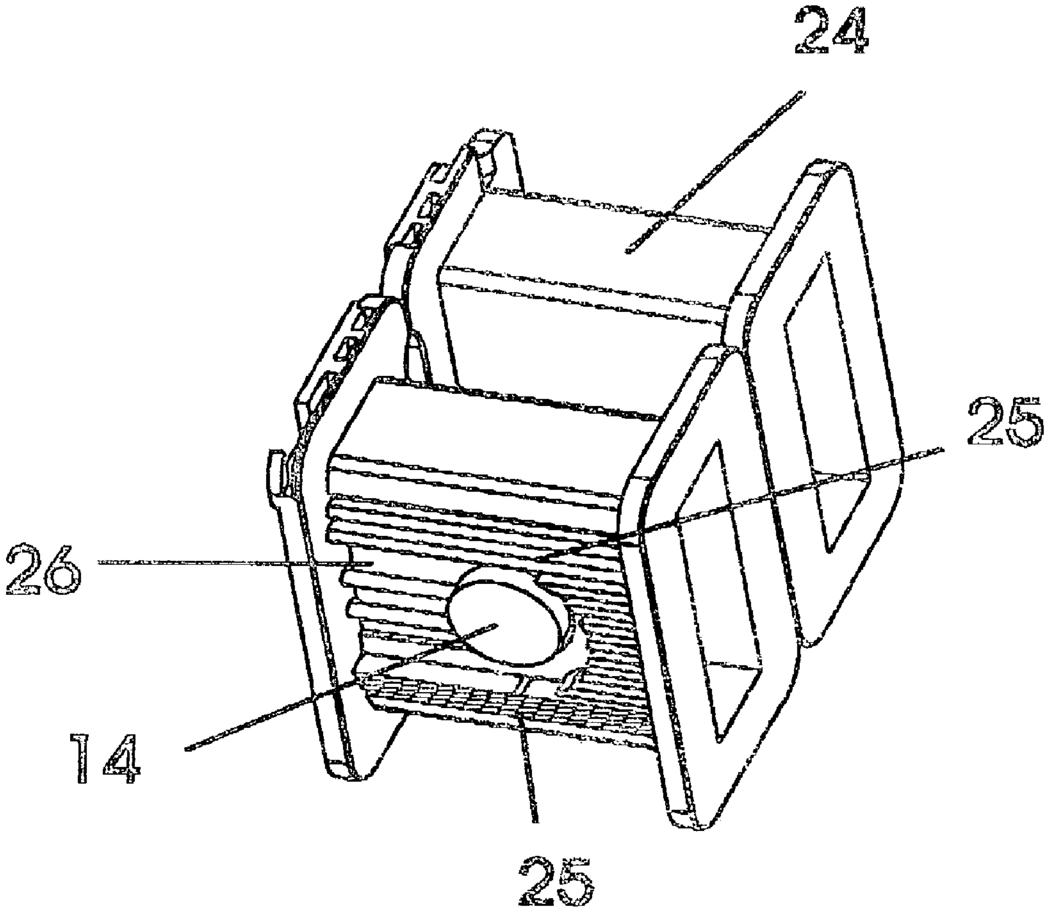
FIG. 2 is an isometric view of the plastic former of FIG. 1, onto which coils of wire are wound, with the thermal switch in place in an indent formed in the former.

FIG. 2 shows the former 24 with the protective thermal switch 14 in place. To assist with the fitting of the thermal switch, a depression 26 would normally be formed in the moulding of the former to ensure that the thermal switch is positioned as close as possible to the winding coils, but without significant protrusion which might subject the switch to excessive crushing forces during the winding of the coil. This positioning is required to ensure that the thermal switch responds as accurately as possible to the temperature of the winding wire. Ribs 25 formed as part of the moulding of former 24 guide the winding wires over the thermal switch 14 while still maintaining close proximity of the wires to switch 14.

Figure 3:
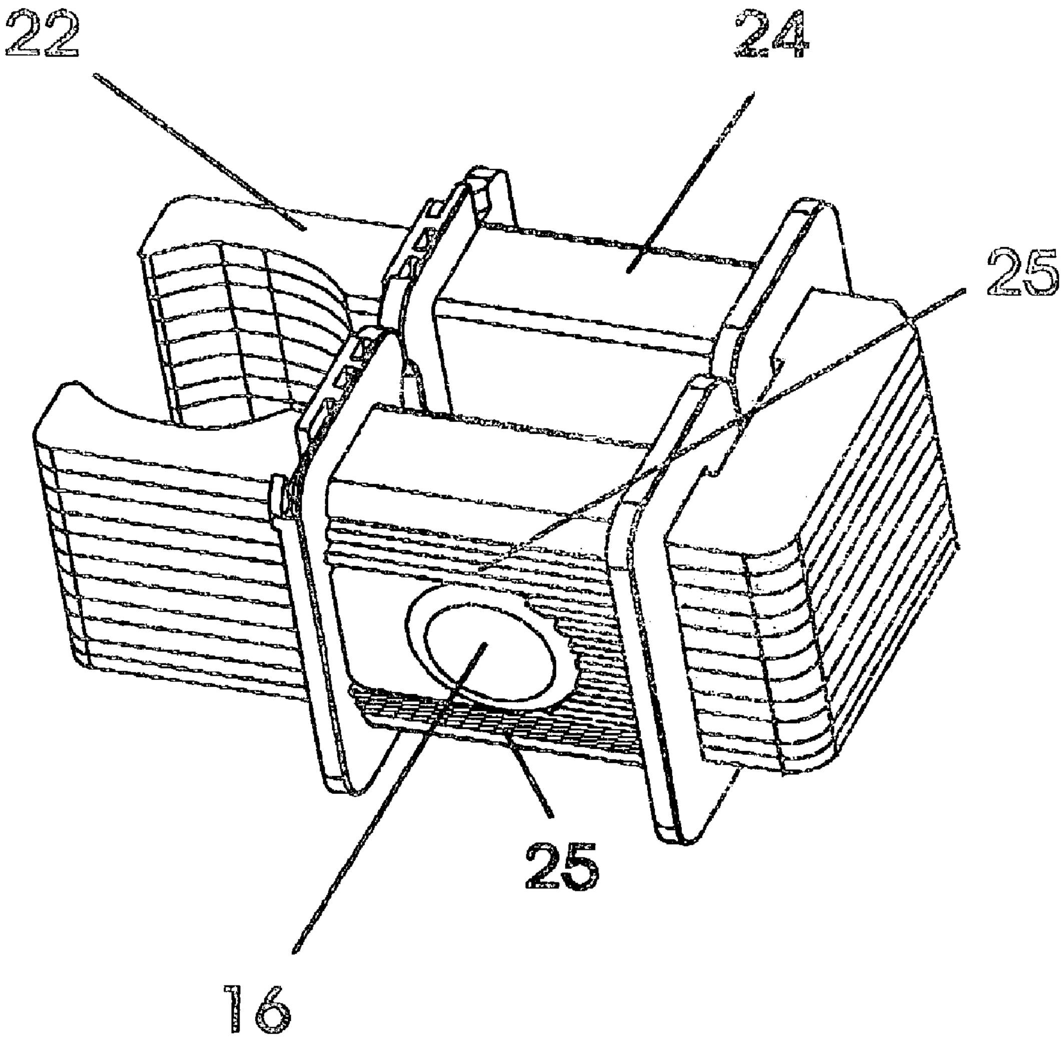
FIG. 3 is an isometric view of the plastic former of FIG. 1 showing the protective cap in place over the thermal switch and with the lamination stack inserted through the plastic former.

In FIG. 3, the protective cap 16 is fitted in position over the thermal switch 14. The shape of the protective cap 16 is designed to be close fitting to the shape of the thermal switch, while ensuring that the protective cap 16 does not actually touch the critical parts of the thermal switch 14 when in position. A small clearance is essential to ensure that forces from winding and thermoplastic injection are kept away from the thermal switch 14. It is preferred that the surfaces of the protective cap 16 on the face adjacent to the winding wire be curved to provide increased resistance to winding forces and injection pressures. It is preferred that the material properties and thickness of sections of the protective cap 16 are such that the resultant deflection of the protective cap 16 during wire winding and thermoplastic injection does not result in contact between the protective cap 16 and the critical components of thermal switch 14 during manufacture. It is preferred that the protective cap 16 be manufactured from an electrically non-conductive material, and it is prefer-red that such electrically non-conductive material be an injection mouldable thermoplastic. It is preferred that the protective cap 16 material has sufficient mechanical strength at the injection moulding temperatures to which it is subjected during thermoplastic injection to withstand moulding pressures without allowing contact between the protective cap 16 and thermal switch 14.

Figure 4:
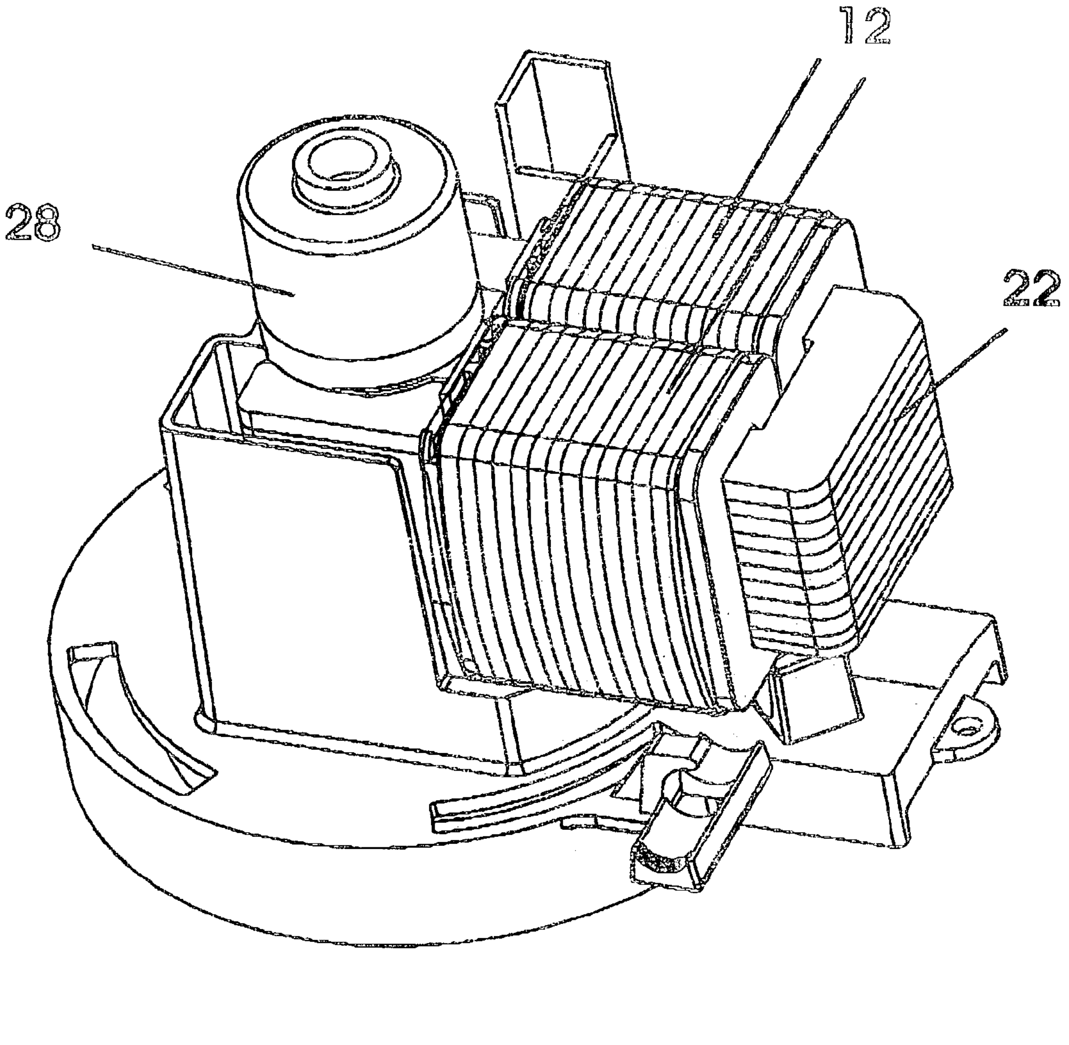
FIG. 4 is an isometric view showing the coil winding in place on the former.
Figure 5:
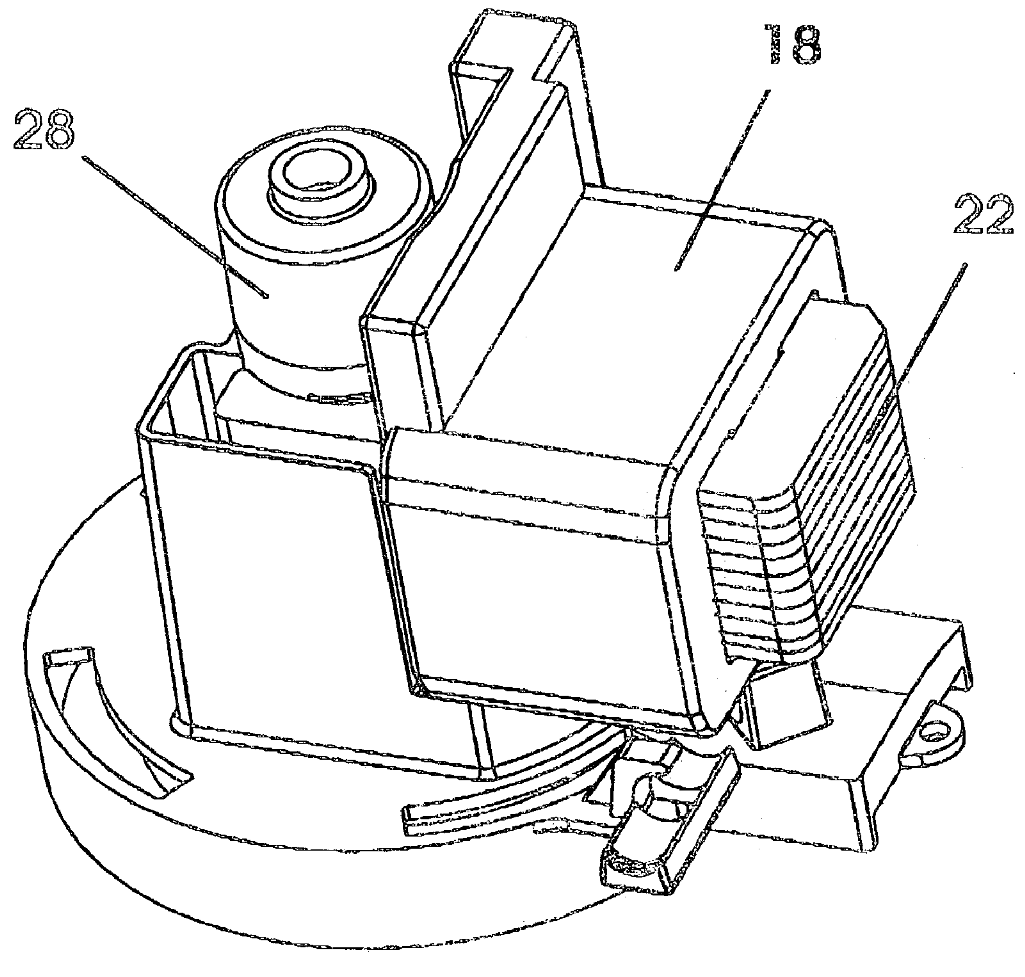
FIG. 5 is a magnified view of FIG. 1*a*.

FIGS. 4 and 5 illustrate the progressive manufacturing processes in making the coil. In FIG. 4, the coil 12 has been wound onto the former 24 and over the thermal switch 14 and its protective cap 16, now not visible beneath coil 12. The coil 12 completely covers the thermal switch 14 and its protective cap 16 ensuring that the thermal switch responds to the temperature of the coil with the least influence from other surroundings. In FIG. 5, the thermoplastic encapsulation 18 has been added by injection plastic moulding over the former and coil. The coil is now completely sealed against the external environment.

Figure 6:
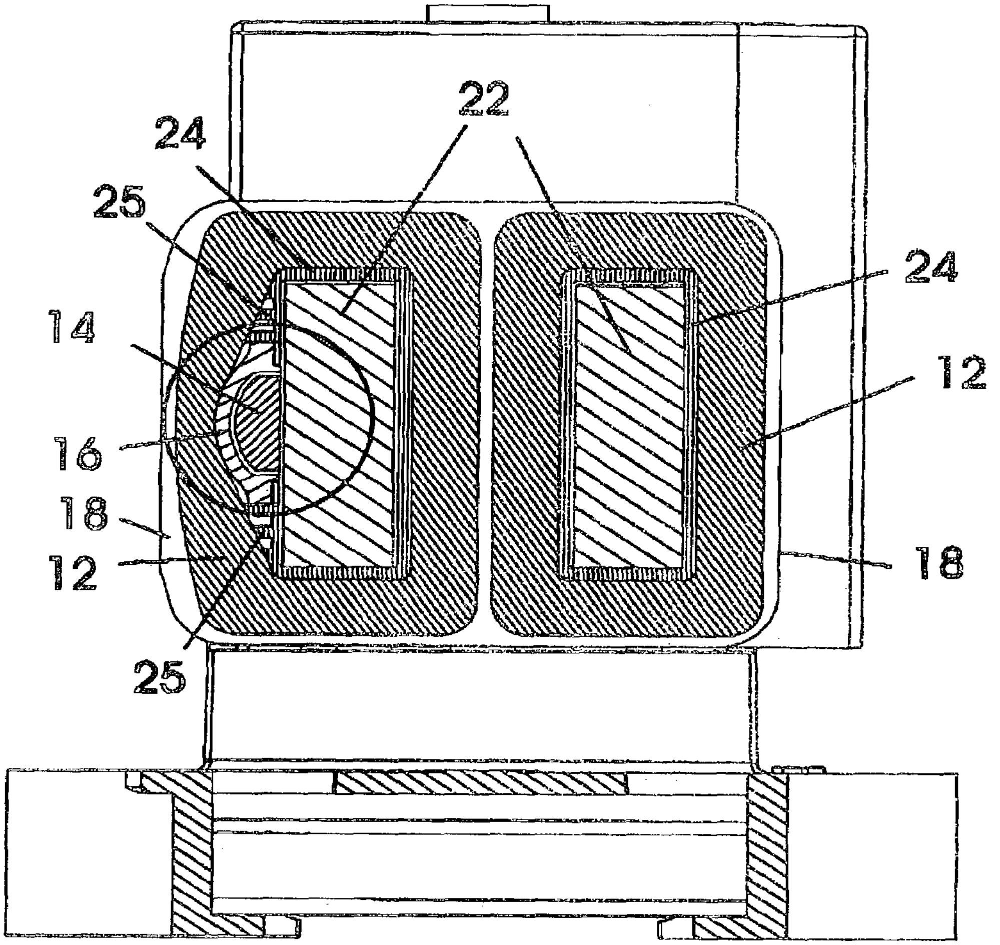
FIG. 6 is a transverse cross-sectional view through the coils and in situ thermal switch and protective cap of FIG. 5.
Figure 6A:
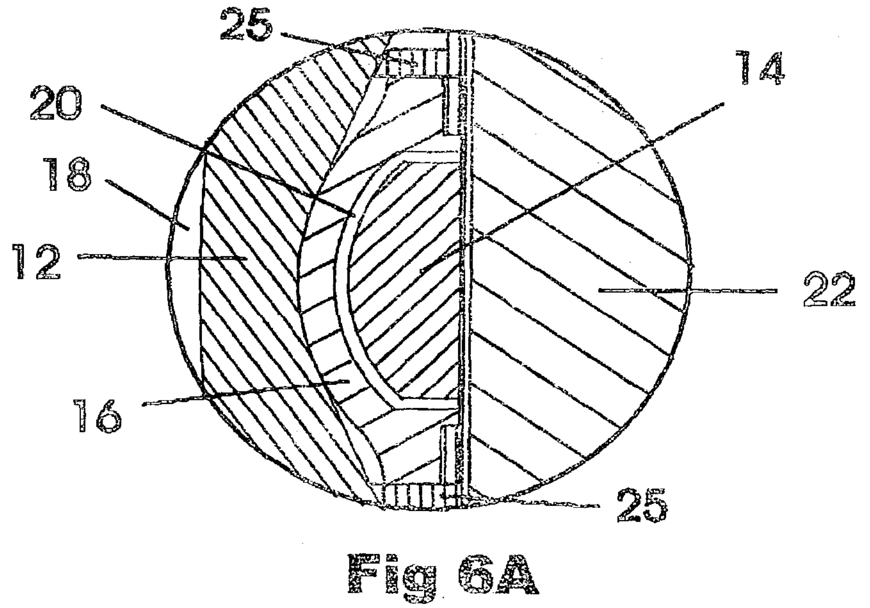
FIG. 6*a* is a magnification of circled region in FIG. 6.

FIG. 6 shows a cross-section through the coil winding 12 and thermal switch 14. Details of the arrangement of the thermal switch 14 and protective cap 16 are magnified in the inset FIG. 6*a*. The protective cover 16 is shaped to provide a close fit to the thermal switch 14, to keep the gap 20 as small as possible when the base of the protective cap 16 is in contact with the former 24. The combination of ribs 25 moulded as part of the former 24 and protective cap 16 guide the wires of coil 12 over the top of protective cap 16 while maintaining physical contact between the wires and protective cap. The tension in the wires of coil 12 while being wound can result in a considerable force on the outer surface of protective cap 16. During the course of injection moulding of the encapsulation 18, all internal components are subjected to high hydrostatic temperatures and pressures. The protective cap 16 seals off the thermal switch 14 from the effect of these high pressures thereby protecting thermal switch 14 from possible crushing and mechanical damage. The small gap 20 between the protective cap 16 and thermal switch 14 allows the protective cap 16 to deflect under the imposed load of the winding of the coil and hydrostatic pressure without coming in contact with the thermal switch 14. It will be appreciated that the curved shape of the protective cap 16 facing the coil 12 significantly improves the strength of the protective cap 16 when subjected to winding and thermoplastic injection forces and pressures.

It will be appreciated by persons skilled in the art that numerous variations and/or modifications may be made to the invention as shown in the specific embodiments without departing from the spirit and scope of the invention as broadly described. The present embodiments are, therefore, to be considered in all respects as illustrative and not restrictive.

What is claimed is:

1. A method of making an electromagnetic coil having a thermal protective switch, said method comprising: positioning said switch in a recess in and against a winding former of said coil, covering said switch with a protective cap adapted to resist forces applied thereto by coil windings wound onto the winding former as well as other forces and temperatures applied during manufacture of the coil, and whereby critical parts of the thermal protective switch protected from damage during manufacture of the electromagnetic coil, and applying coil windings to the winding former such that the windings cover and contact the protective cap.

2. A method as claimed in claim 1, wherein the recess is defined by a plurality of parallel ribs located on the winding former.

3. A method of making an electromagnetic coil having a thermal protective switch, said method comprising:

placing said switch into a depression in a winding former, positioning said switch against the winding former of said coil, covering said switch with a protective cap adapted to resist forces applied thereto by coil windings wound onto the winding former as well as other forces and temperatures applied during manufacture of the coil, and whereby critical parts of the thermal protective switch protected from damage during manufacture of the electromagnetic coil, applying coil windings to the winding former such that the windings cover and contact the protective cap, and encapsulating the thus formed electromagnetic coil.

4. An electric motor with a thermal switch comprising:

a) a former having a cavity into which the thermal switch is placed, wherein said switch engages said former;

b) a protective cap for covering said switch while leaving a gap therebetween;

c) a coil comprising a series of electrical windings around said former, wherein said winding encases the entire cover; and d) encapsulating material for sealing the electrical windings.

5. The electric motor with a thermal switch of claim 4, wherein said former comprises a plurality of ribs.

6. The electric motor with a thermal switch of claim 4, wherein said cap is manufactured from an electrically non-conductive material.

7. The electrical motor of claim 4, wherein said encapsulating material is comprised of thermoplastic material.

8. The electrical motor of claim 4, wherein the geometrical configuration of said cap is designed to resist deformation under compressive forces applied thereto.

* * * * *